US006250693B1

(12) United States Patent
Gensert et al.

(10) Patent No.: US 6,250,693 B1
(45) Date of Patent: Jun. 26, 2001

(54) DEVICE FOR CONNECTING TWO TUBULAR PIPE SECTIONS

(75) Inventors: Heiko Gensert, Eppstein; Arndt Peters, Weinstadt; Horst Schneider, Gammelshausen; Helmut Wierzba, Schwabach; Rüdiger Scharioth, Attendorn, all of (DE)

(73) Assignees: Daimler-Benz Aktiengesellschaft, Stuttgart; Leistritz AG & Co. Abgastechnik, Furth/Bavern; Fa. Muhr und Bender, Attendorn, all of (DE)

( * ) Notice: Subject to any disclaimer, the term of this patent is extended or adjusted under 35 U.S.C. 154(b) by 0 days.

(21) Appl. No.: 09/199,582

(22) Filed: Nov. 25, 1998

(30) Foreign Application Priority Data

Nov. 26, 1997 (DE) .......... 197 52 280

(51) Int. Cl.[7] .......... F16L 17/00

(52) U.S. Cl. .......... 285/364; 285/406; 285/420

(58) Field of Search .......... 285/305, 49, 420, 285/268, 424, 261, 364, 406

(56) References Cited

U.S. PATENT DOCUMENTS 2,691,201 * 10/1954 Matthews .......... 285/406
3,479,069 * 11/1969 Sedam .......... 285/420
3,791,681 * 2/1974 Moldow .......... 285/424
5,348,353 9/1994 Deweerdt .
5,820,168 * 10/1998 Giacomoni .......... 285/420

FOREIGN PATENT DOCUMENTS

105198 * 1/1927 (AT) .......... 285/364
2913561 * 10/1979 (DE) .......... 285/261
44 44 550 6/1996 (DE) .
197 28 973 1/1999 (DE) .
0 434 529 6/1991 (EP) .
1244960 * 9/1960 (FR) .......... 285/364
1 277 596 3/1962 (FR) .
2 360 028 12/1978 (FR) .
24094 * 9/1896 (GB) .......... 285/406
176889 * 7/1989 (JP) .......... 285/305

* cited by examiner

*Primary Examiner*—Teri Pham Luu
(74) *Attorney, Agent, or Firm*—Kenyon & Kenyon

(57) ABSTRACT

A device for connecting two tubular pipe sections. A sealing device is arranged between the pipe sections. At their ends, the pipe sections in each case have a flange-type end piece. The pipe sections are held together by a spring device using a pre-tensioning force, the spring device having a mid-section extending at right angles to the longitudinal axis of the pipe sections. The spring device has a spring element, from whose transverse sides of the mid-section, which extend at right angles to the longitudinal axes of the pipe sections, spring limbs extend. Forming an at least approximate U-shape with the mid-section, the spring limbs extend at least partially over the periphery of the pipe sections, the spring limps each having a centrical cut-out that is adapted to the outside diameter of the pipe sections and in which a pipe section is accommodated in each case in the mounted state of the spring element.

14 Claims, 2 Drawing Sheets

DEVICE FOR CONNECTING TWO TUBULAR PIPE SECTIONS

FIELD OF THE INVENTION

The present invention relates generally to a device for connecting two tubular pipe sections and more particularly to a device for connecting two tubular pipe sections in an exhaust system of a motor vehicle.

RELATED TECHNOLOGY

German Patent Application No. 44 44 550 A1 discloses a device for connecting two tubular pipe sections, the connecting pieces being held together by spring means using a pre-tensioning force. The spring means feature one plate spring braced against one connecting piece, and one further plate spring in operative connection with a respective other connecting piece. The two plate springs are pre-tensioned against each other by clamps. However, this design is relatively costly in construction, and moreover, requires a relatively great amount of additional installation space.

French Patent Document No. 2 360 028 describes a device for connecting two tubular pipe sections in the exhaust system of a motor vehicle, a coiled spring being tensioned between the two connecting pieces which presses the two pipe sections apart in the axial direction. The intention with this arrangement is to decouple engine vibrations which, however, is only inadequately performed in this case.

Further types of connections known from the art, such as bolted flanged couplings or plug-in connections, in which exhaust pipes are inserted into one another and then joined by a clamping ring, require special decoupling elements for decoupling vibrations. These additionally must be welded into the system, or secured to it in another manner.

The known pipe connections also have the disadvantage that they require too much effort in their construction, cause great expense, and take up a large installation space.

SUMMARY OF THE INVENTION

An object underlying the present invention is to provide a device for connecting two tubular pipe sections which is simple in its design, is cost-effective, and takes up little installation space.

The present invention provides a device for connecting two tubular pipe sections, in particular pipe sections in an exhaust system of a motor vehicle. A sealing device is arranged between the pipe sections, the pipe sections each having a flange-type end piece at their ends, and the pipe sections being held together by a spring device using a pre-tensioning force. The spring device has a mid-section extending at right angles to the longitudinal axis of the pipe sections and has a spring element (4). From the transverse sides of the mid-section (5), which extend at right angles to the longitudinal axes (9) of the pipe sections (1,2), spring limbs (6,7) extend at least partially over the periphery of the pipe sections (1,2), forming an at least approximate U-shape. The spring limbs (6,7) each having a centrical cut-out (8) that is adapted to the outside diameter of the pipe sections (1,2) and in which a pipe section (1,2) is accommodated in each case in the mounted state of the spring element (4).

The embodiment of the device according to the present invention offers the possibility of guiding the spring element over the two end pieces in such a way that the two pipe sections are held together by the pre-tensioning force. In so doing, it is advantageous that the interconnection region of the two pipe sections can be kept very small, which means only a small installation space is needed. Furthermore, the spring element can be mounted in a simple manner without additional tools.

The device of the present invention is used not only for connecting pipes, e.g. exhaust pipes of a motor vehicle, but also for connecting an exhaust pipe to a pipe connection of a turbocharger as a pipe section.

BRIEF DESCRIPTION OF THE DRAWINGS

Advantageous further developments and refinements of the present invention come to light from the exemplary embodiments described in the following with reference to the drawings, in which.

DETAILED DESCRIPTION

Figure 1:
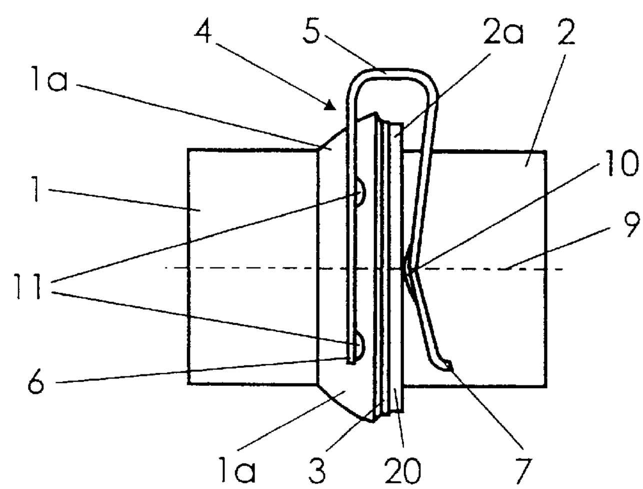
FIG. 1 shows the connecting device in side view.

FIG. 1 shows a side view of a device for connecting two tubular pipe sections 1,2. Pipe section 1 has an end piece 1*a* in the shape of a spherical segment, and pipe section 2 has a flange-type end piece 2*a*. Provision is made between the two pipe sections 1,2 for a sealing device 3 which is intended to prevent the escape of exhaust from the piping system.

Provided as a spring device for connecting the two pipe sections 1,2 is a spring element 4 having a mid-section 5 which, with its longitudinal axis at right angles to the longitudinal axes 9 of the two pipe sections 1,2, extends over said pipe sections 1,2. Emanating in each case from the transverse sides of mid-section 5, which extend at right angles to the longitudinal axes of the two pipe sections, are spring limbs 6,7 that extend at least partially over the periphery of pipe sections 1,2. Mid-section 5, together with both spring limbs 6,7, forms a U-shape, spring limbs 6,7 in each case having a centrical cut-out 8 that is adapted to the outside diameter of pipe sections 1,2, i.e. to their end pieces la, 2*a*, and in which pipe sections 1,2 are arranged in the mounted state of the spring element.

Spring element 4 embraces end pieces 1*a*; 2*a* in the axial direction and, under preloading, presses the two pipe sections 1,2 against each other, thus producing a firm connection between them.

The spring element, which is designed as a flat spring 4, (or rather its spring tension) is braced on pipe section 2, i.e. end piece 2*a*, via a contact surface which is formed of two cylindrical or conical protuberances 10 directed toward the other pipe section 1. On spring limb 6, which lies against pipe section 1, i.e. end piece 1*a,* the contact surface is formed by four premoldings having the shape of a spherical segment and directed toward the other pipe section 2. Premoldings 11 cause flat spring 4 to be centered on end piece 1*a* and its position to be clearly defined, since in each case two premoldings are arranged on a side, i.e. lying opposite each other.

In another specific embodiment deviating from the present exemplary embodiment, the two premoldings or protuberances 10 can be designed as round indentations, or, instead of the two premoldings, three or four premoldings can be applied. If necessary, even more premoldings can also be applied, in order to achieve a uniform force distribution. Consequently, flat spring 4 can be produced from a flat sheet which receives the form of flat spring 4 in U-shape only by deformation.

In a further specific embodiment not shown, premoldings 11, which in the present exemplary embodiment are designed like spherical segments, can be formed cylindrically or in a similarly suitable shape.

Since, given strong vibrational stress of pipe sections 1,2, the danger exists that flat spring 4 will slip off from pipe sections 1,2, it can be necessary to provide a slip-protector 12 on flat spring 4. The slip-protector 12 can be two opposite-lying tabs which are arranged on one of spring limbs 6,7, and are shown schematically in FIG. 2. Tabs 12 are arranged in advantageous manner on the side of spring limbs 6,7 facing away from mid-section 5, and partially embrace either pipe section 1 or pipe section 2 on the side facing away from mid-section 5.

Figure 2:
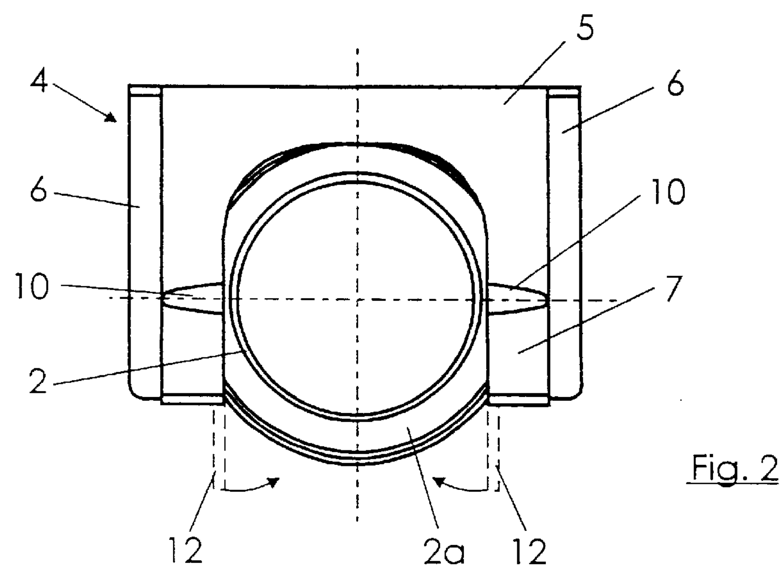
FIG. 2 shows a view of the connecting device, from the front in basic representation, according to FIG. 1.
Figure 3:
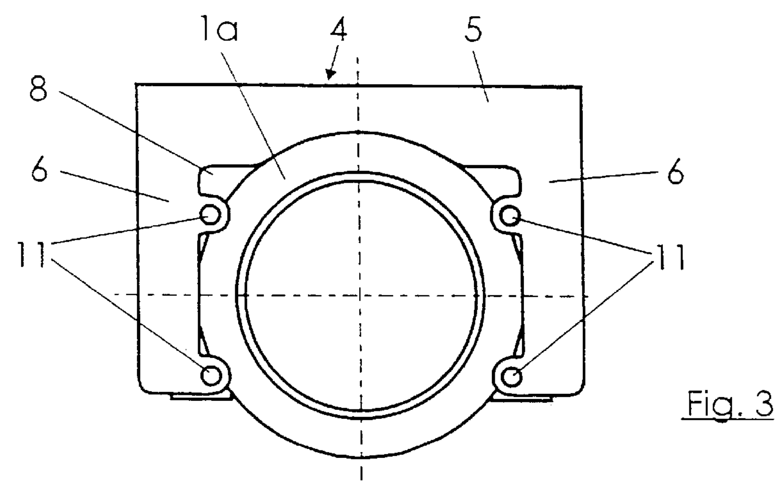
FIG. 3 shows a rear view of the connecting device in basic representation according to FIGS. 1 and 2.

During assembly, flat spring 4 is slipped on radially over the two pipe sections 1,2, the two lateral tabs 12 being pressed via pipe section 1 and 2, respectively, each being bent or folded toward pipe sections 1,2 as shown by the arrows in FIG. 2, so that tabs 12 partially embrace pipe sections 1,2.

Figure 4:
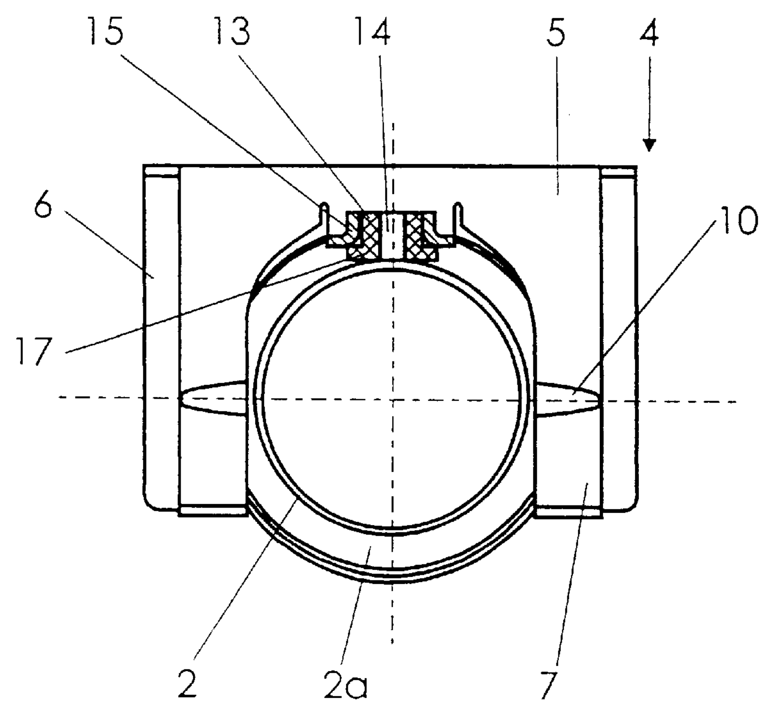
FIG. 4 shows a further specific embodiment of the connecting device in a front view.
Figure 5:
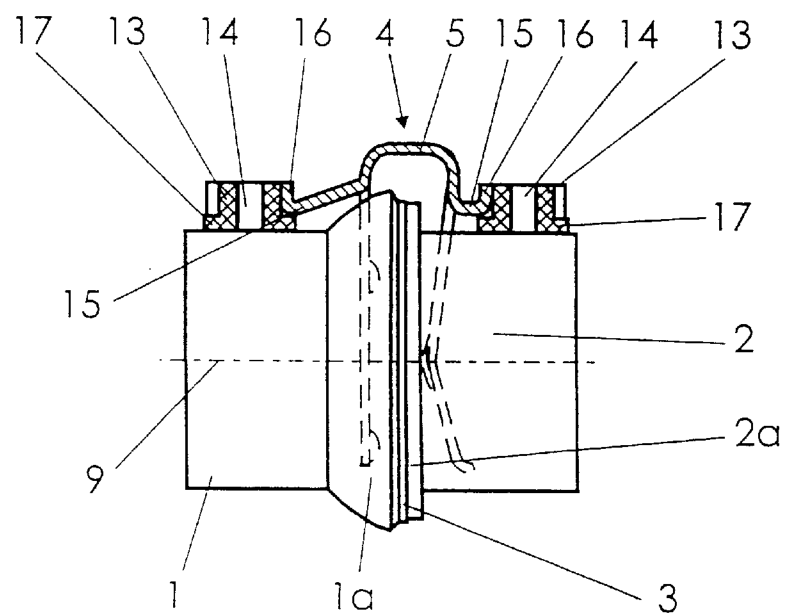
FIG. 5 shows a side view of the connecting device according to FIG. 4.

FIGS. 4 and 5 show a further specific embodiment of the connecting device. In this case, on each side of flat spring 4, a wire cushion 13 is slipped onto a bolt 14 which is secured to the two pipe sections 1,2. At mid-section 5 of flat spring 4, a tab 15 extends from each transverse side and is provided in each case with a peripheral raised collar 16. Wire cushion 13 is pressed by collar 16 against pipe section 1, and thus wire cushion 13 is prevented from lifting off independently from bolt 14.

The arrangement of wire cushions 13 and tabs 12 with collar 16 formed thereon in each case, effectively prevents the two pipe sections 1,2 from twisting. Tabs 12 act on wire cushions 13 with an axial force, which means a clamping effect is attained on wire cushions 13, such that they cannot lift off from bolts 14, and pipe sections 1,2 are no longer twisted relative to each other because of torsional vibrations in the exhaust system.

Wire cushions 13 represent a spring-damper system, by which the characteristics of the connection can be so adjusted that the vibrations introduced into the automobile body can be perceptibly reduced.

In the present exemplary embodiment according to FIGS. 4 and 5, wire cushions 13 feature a round design and have a peripheral rim 17.

In a specific embodiment deviating from the present exemplary embodiment, the wire cushions can have an oval design.

Moreover, it naturally lies within the discretion of one skilled in the art to provide wire cushions 13 not only in the manner shown on pipe sections 1,2, but additionally, or even alternatively, to arrange then on lateral spring limbs 6,7. The position and number of wire cushions 13 used is determined by the assembling capability and the desired properties with regard to the decoupling of torsional vibrations in the exhaust system. Since wire cushions 13 are securely joined to pipe sections 1,2, and flat spring 4, via tabs 15, permits pipe sections 1,2 to be torsionally fixed to one another, it is assured in a simple and advantageous manner that torsional vibrations can be reduced by the connecting device, without the two pipe sections 1,2 being able to twist relatively to each other.

What is claimed is:

1. A device for connecting a first tubular pipe section and a second tubular pipe section, a sealing device being arranged between the first and the second pipe sections, the first pipe section having a first flange-type end piece, and the second pipe section having a second flange-type end piece, the device comprising:

a spring for holding together the first and second tubular pipe sections using a pre-tensioning force, the spring including a mid-section with transverse sides extending at right angles to a longitudinal axis of the first and second pipe sections and including first and second spring limbs extending from the transverse sides;

a slip protector attached to the spring and at least partially embracing at least one of the first and second tubular pipe sections on a portion of the at least one tubular pipe section facing away from the mid-section;

the first and second spring limbs extending at least partially over a periphery of the first and second pipe sections, the mid-section and the first and second limbs forming an at least approximate U-shape, the first spring limb having a first centrical cut-out adapted to an outside diameter of the first pipe section and the second spring limb having a second centrical cut-out adapted to an outside diameter of the second pipe section, the first cut-out accommodating the first pipe section and the second cut-out accommodating the second pipe section when the spring is in a mounted state.

2. The device as recited in claim 1 wherein the first and second spring limbs have contact surfaces for contacting the first and second end pieces.

3. The device as recited in claim 2 wherein the contact surfaces include at least two protuberances.

4. The device as recited in claim 2 wherein the contact surfaces include at least two hemispherical premoldings.

5. The device as recited in claim 1 wherein the slip-protector includes a first bendable tab provided on the first spring limb and a second bendable tab provided on the second spring limb.

6. The device as recited in claim 1 further comprising a first wire cushion on a first bolt and second wire cushion on a second bolt, the first bolt being securely joined to the first pipe section and the second bolt being securely joined to the second pipe section, the spring including at least two tabs on the mid section for contacting the wire cushions so as to inhibit a relative motion between the first and second pipe sections.

7. The device as recited in claim 6 wherein at least one of the wire cushions is at least approximately round and has a peripheral rim.

8. Piping for an exhaust system of a motor vehicle comprising:

a first tubular pipe section having a first flange-type end piece;

a second tubular pipe section having a second flange-type end piece;

a sealing device arranged between the first and second pipe sections;

a spring for holding the first and second pipe sections together through a pre-tensioning force, the spring including a mid-section with transverse sides extending at right angles to a longitudinal axis of the first and second pipe sections and including first and second spring limbs extending from the transverse sides; and a slip-protector attached to the spring, the slip protector at least partially embracing at least one of the first and second tubular pipe sections on a portion of the at least one tubular pipe section facing away from the mid-section;

the first and second spring limbs extending at least partially over a periphery of the first and second pipe sections, the mid-section and the first and second spring limbs forming an at least approximate U-shape, the first spring limb having a first centrical cut-out accommodating an outside diameter of the first pipe section and the second spring limb having a second centrical cut-out accommodating an outside diameter of the second pipe section.

9. The piping as recited in claim 8 wherein the first and second spring limbs have contact surfaces for contacting the first and second end pieces.

10. The piping as recited in claim 9 wherein the contact surfaces include at least two protuberances.

11. The piping as recited in claim 9 wherein the contact surfaces include at least two hemispherical premoldings.

12. The piping as recited in claim 8 wherein the slip-protector includes a first bendable tab provided on the first spring limb and a second bendable tab provided on the second spring limb.

13. The device as recited in claim 8 further comprising a first wire cushion on a first bolt and second wire cushion on a second bolt, the first bolt being securely joined to the first pipe section and the second bolt being securely joined to the second pipe section, the spring including at last two tabs on the mid section for contacting the wire cushions so as to inhibit a relative motion between the first and second pipe sections.

14. The device as recited in claim 13 wherein at least one of the wire cushions is at least approximately round and has a peripheral rim.

* * * * *